(12) United States Patent
Covin

(10) Patent No.: US 11,406,220 B1
(45) Date of Patent: Aug. 9, 2022

(54) FOOD COOKING ENCLOSURE

(71) Applicant: Terry L. Covin, Bozeman, MT (US)

(72) Inventor: Terry L. Covin, Bozeman, MT (US)

( * ) Notice: Subject to any disclaimer, the term of this patent is extended or adjusted under 35 U.S.C. 154(b) by 0 days.

(21) Appl. No.: 17/524,164

(22) Filed: Nov. 11, 2021

Related U.S. Application Data

(60) Provisional application No. 63/112,284, filed on Nov. 11, 2020.

(51) Int. Cl.
| | |
|---|---|
| *A47J 36/20* | (2006.01) |
| *A47J 37/01* | (2006.01) |
| *F24C 15/16* | (2006.01) |
| *A47J 37/06* | (2006.01) |
| *A47J 36/02* | (2006.01) |
| *A47J 36/06* | (2006.01) |

(52) U.S. Cl.
CPC ............... *A47J 36/20* (2013.01); *A47J 36/02* (2013.01); *A47J 36/06* (2013.01); *A47J 37/01* (2013.01); *A47J 37/067* (2013.01); *F24C 15/16* (2013.01)

(58) Field of Classification Search
CPC .. A47J 36/20; A47J 36/02; A47J 36/06; A47J 37/01; A47J 37/067; F24C 15/16
USPC ....... 219/391, 392, 395, 402, 405–408, 725, 219/756, 762; 126/190, 332, 333, 339; 99/337
See application file for complete search history.

(56) References Cited

U.S. PATENT DOCUMENTS

| | | |
|---|---|---|
| 2,248,198 A | 7/1941 | Ratz |
| 3,036,192 A | 5/1962 | Fry |
| 3,192,917 A | 7/1965 | Baert |
| 3,368,732 A | 2/1968 | Kimble |
| 4,037,581 A | 7/1977 | Trifiletti |
| 4,778,968 A * | 10/1988 | Torres ..................... H05B 6/64 126/39 M |
| 5,878,738 A | 3/1999 | Poirier |
| 5,927,266 A | 7/1999 | Maugard |
| 7,122,765 B2 | 10/2006 | Wong et al. |
| 9,657,950 B2 | 5/2017 | Boucher |

* cited by examiner

*Primary Examiner* — Phuong T Nguyen
(74) *Attorney, Agent, or Firm* — Cramer Patent & Design, PLLC; Aaron R. Cramer

(57) ABSTRACT

A food enclosure for oven cooking device comprises a modular cuboid cover configured to prevent cooking splatter from coming into contact with an interior oven surface. Each panel of the cover comprises a fine heat resistant mesh. The base of the device comprises a broiling pan.

20 Claims, 5 Drawing Sheets

FOOD COOKING ENCLOSURE

RELATED APPLICATIONS

The present invention was first described in and claims the benefit of U.S. Provisional Application No. 63/112,284 filed Nov. 11, 2020, the entire disclosures of which are incorporated herein by reference.

FIELD OF THE INVENTION

The present invention relates to an enclosure for food held therewithin during a cooking process.

BACKGROUND OF THE INVENTION

Cooking food in the oven is a popular method of food preparation. Some common concerns associated with this cooking process is the exposure of meats to carcinogenic agents during cooking, as well as the prevalent amount of smoke that is produced when dripping food items come into contact with the hot inner surfaces of the oven. Meats in particular contain fat which tends to melt and run off of the meat during cooking. Should this fat come into contact with a very hot surface, the smoke produced as a result has been shown to contain known carcinogens such as polycyclic aromatic hydrocarbons (PAH). This carcinogen-laden smoke collects in the oven and can penetrate the meat with these harmful substances as a result, increasing long term health risks for those who consume the meat, particularly if done so on a regular basis. Also, this smoke can easily be vented out of the oven and into the kitchen area, resulting in a smoky atmosphere, an unwelcome smell, and quite possibly the inadvertent activation of a smoke alarm.

Some people will utilize aluminum foil underneath meat during cooking in order to present a barrier between the food and the heat source and/or the interior of the oven. While aluminum foil can protect meat from smoke and provide the ability to distribute heat across the meat, it can have the effect of trapping any grease or oil from fats contained within the various types of meat. This oil remains with the food after cooking and leads to increased fat consumption which poses other associated health risks.

SUMMARY OF THE INVENTION

The inventor has recognized the aforementioned inherent problems and lack in the art and observed that there is a need for a food cooking enclosure that has a frame having a four-sided box adapted to fit on top of a base cooking surface, the frame includes a solid perimeter body, a lid having a lid perimeter body with a lid screen affixed thereto to cover the lid perimeter body, a base having a base basin with a top opening and an interior with a perimeter lip extending outward from a first plurality of sidewalls, the base cooking surface is placed within the base basin to allow a first plurality of drippings to collect in the base basin and the frame and the lid are disposed on the base, a broiler splatter guard having a four-sided structure placed on the base cooking surface, and a second insert including a second insert basin with a top opening and a top interior with a perimeter second insert lip extending outward from a second plurality of sidewalls. The second insert is suspended from an upper perimeter portions on the solid perimeter body.

The solid perimeter body may include a mesh screen affixed thereto to cover the solid perimeter body. The frame may include a front screen having a pair of front screen first side tabs each extending away from an upper portion and a lower portion of a first side of the solid perimeter body. The frame may further include a rear screen having a pair of rear screen first side tabs each extending away from the upper portion and the lower portion of the first side of the solid perimeter body. The frame may include a pair of rear screen second side tabs each extending away from an upper portion and a lower portion of a second side of the solid perimeter body. The frame may include a pair of front screen second side tabs each extending away from the upper portion and the lower portion of the second side of the solid perimeter body. The broiler splatter guard may include a four-sided structure placed on the base cooking surface to support one or more foodstuffs placed on the base cooking surface. The broiler splatter guard may be contained within the basin.

The base, the broiler splatter guard, the second insert, and the lid may be utilized interchangeably. A second insert cooking surface may be placed within the second insert basin. The second insert cooking surface may include a plurality of second insert cooking surface apertures to allow a second plurality of drippings to pass through and collect in the second insert basin. The food cooking enclosure may further comprise a first bracket with a pair of distal first bracket lips intended to engage the upper surface of the solid perimeter bodies of one of the screens. The food cooking enclosure may further comprise a second bracket with a pair of distal second bracket lips intended to engage the upper surface of the solid perimeter bodies of one of the screens. The brackets may be generally shaped as a straight-sided "U". The food cooking enclosure may be a clean and compact cooking enclosure for a plurality of food adapted to be cooked in an oven-type enclosure. The food cooking enclosure may be made of an inert material. The food cooking enclosure may be made of a washable material. The food cooking enclosure may be made of a material that withstands cooking temperature. The food cooking enclosure may be made of stainless steel. The food cooking enclosure may be conventional broiler pan dimensions.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
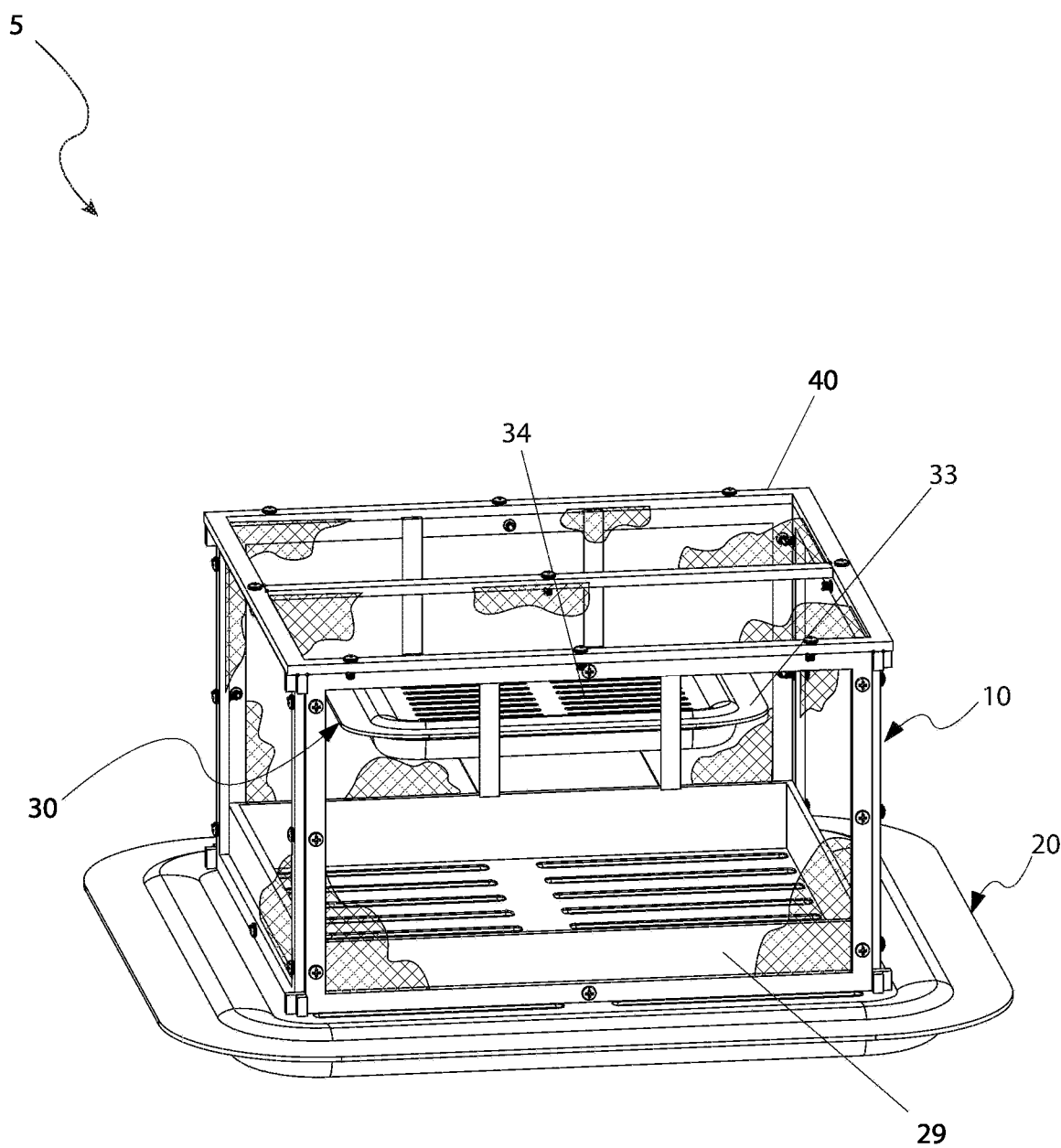
FIG. 1 is a front perspective view of a food cooking enclosure, according to a preferred embodiment of the present invention.

DESCRIPTIVE KEY 5 food cooking enclosure
10 frame 11 front screen
12a front screen first side tab
12b front screen second side tab
13 rear screen
14a rear screen first side tab
14b rear screen second side tab
15 first side screen
16a first side screen first side tab
16b first side screen second side tab
17 second side screen
18a second side screen first side tab
18b second side screen second side tab
19a perimeter body
19b screen
20 base
21 base basin
22 base cooking surface
25 base cooking surface aperture
27 base lip
29 broiler splatter guard
30 second insert
31a first bracket
31b second bracket
32a first bracket lip
32b second bracket lip
33 second insert basin
34 second insert cooking surface
35 second insert cooking surface aperture
37 second insert lip
40 lid
41a lid perimeter body
41b lid screen
42 lid central member

DESCRIPTION OF THE INVENTION

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

DETAILED DESCRIPTION OF THE FIGURES

Figure 2:
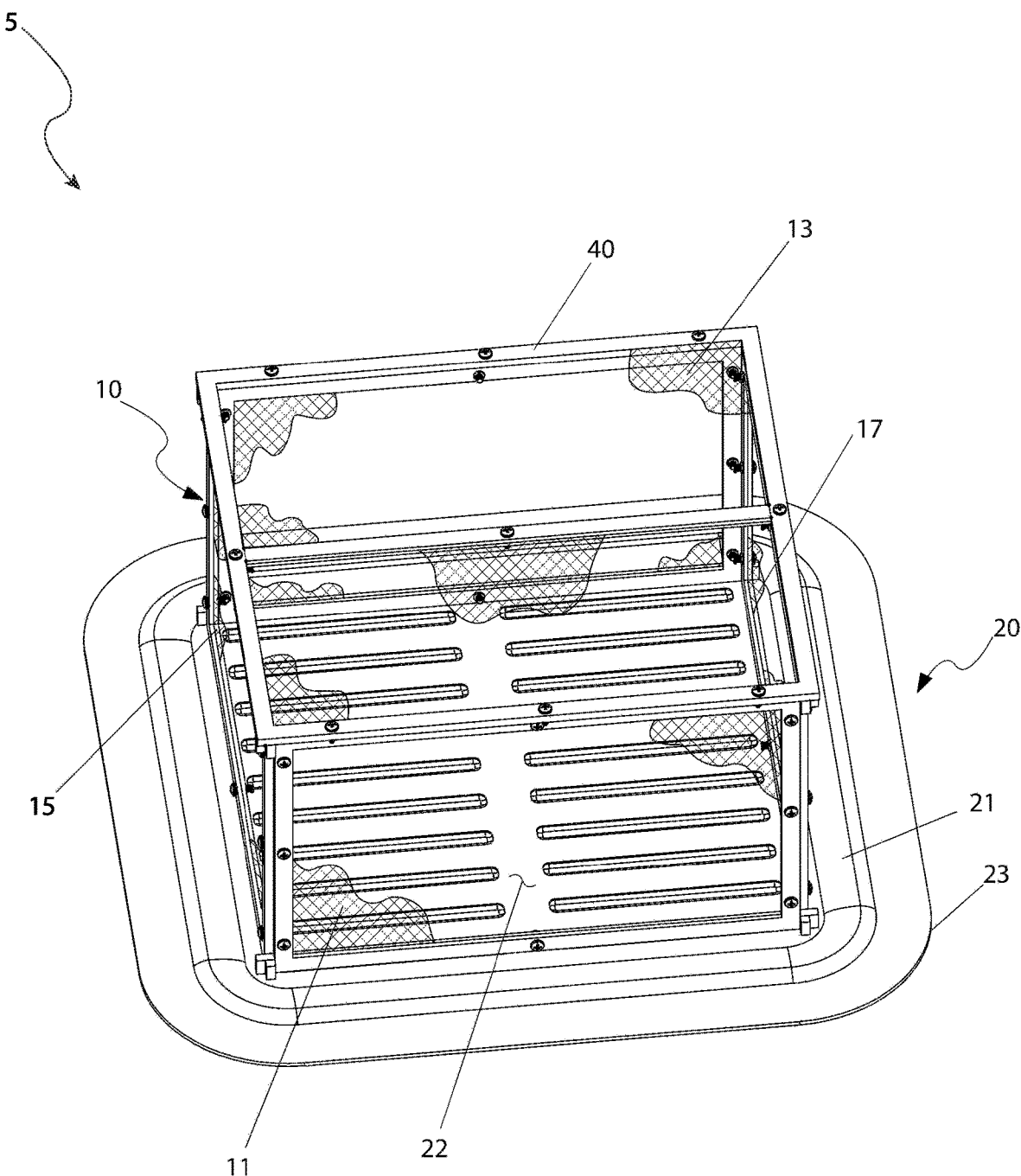
FIG. 2 is a top perspective view of the food cooking enclosure, according to a preferred embodiment of the present invention.
Figure 7:
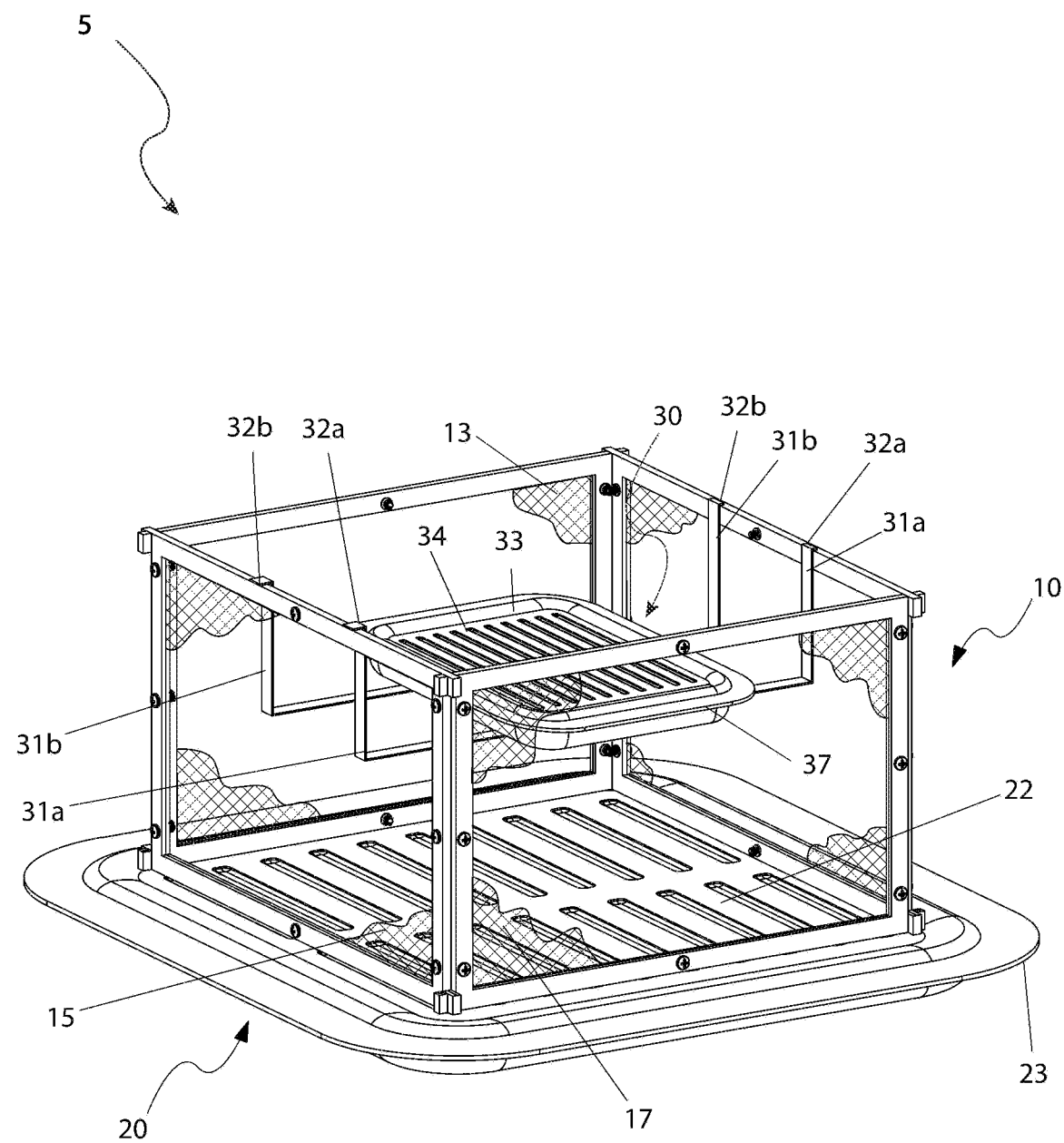
FIG. 7 is a front perspective view of a food cooking enclosure with the lid removed, according to a preferred embodiment of the present invention.

Referring now to FIG. 1, there is illustrated a food cooking enclosure 5 intended to provide a relatively clean and compact cooking enclosure for food to be cooked in an oven-type enclosure. The food cooking enclosure 5 includes a frame 10, a lid 40, a base 20, a broiler splatter guard 29 (please see FIG. 5) and a second insert 30. Each of the base 20, broiler splatter guard 29, second insert 30, and lid 40 can be used interchangeably or to the desires of the user. It is preferred that the components of the enclosure 5 are manufactured out of an inert, easily washable material capable of withstanding elevated temperatures commonly associated with cooking, such as stainless steel. FIG. 1 illustrates the enclosure 5 with the second insert 30 supported within the frame 10 and the lid 40 in place and placed on the base 20, as well as the broiler splatter guard 29 placed on the base 20. FIG. 2 illustrates merely the frame 10 and lid 40 placed on the base 20. FIG. 7 illustrates a similar embodiment of the food cooking enclosure 5 as in FIG. 1, but with the lid 40 removed.

Figure 5:
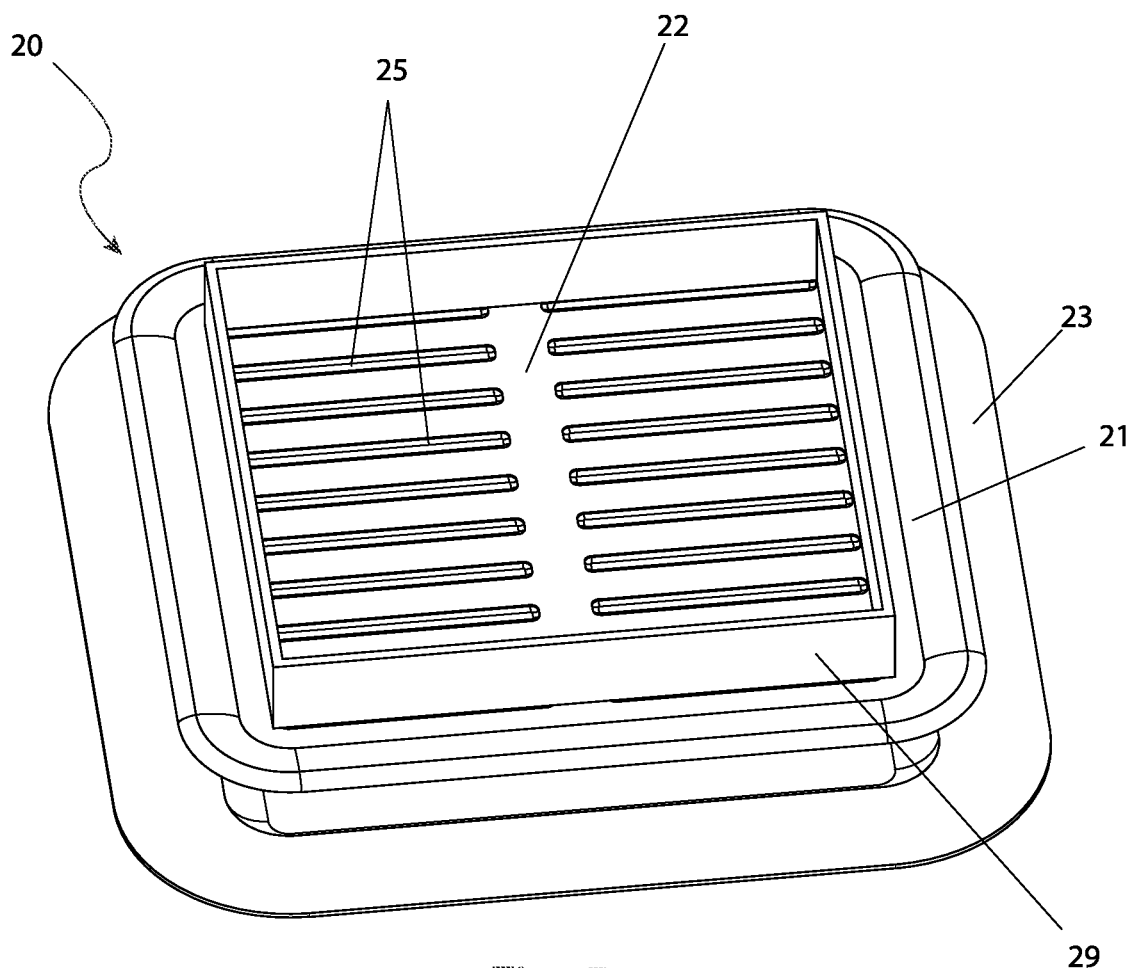
FIG. 5 is a top perspective view of a base, according to a preferred embodiment of the present invention.

Referring now to FIG. 5, the base 20 of the food cooking enclosure 5 is in similar size and shape as a conventional broiler pan. The base 20 may include a base basin 21 having a top opening and an interior with a perimeter lip 27 extending outward from the sidewalls. A base cooking surface 22 can be placed within the base basin 21. The base cooking surface 22 in a preferred embodiment has a plurality of base cooking surface apertures 25 to allow drippings to pass through and collect in the base basin 21. Also present in this illustration is a broiler splatter guard 29 in the shape of a four-sided structure capable of being placed on the base cooking surface 22, or alternately within the basin 21. The broiler splatter guard 29 is particularly suited for providing a bracketing function to any foodstuffs placed on the base cooking surface 22. More specifically, the broiler splatter guard 29 is intended to act as a broiler splatter protector when use with the food cooking enclosure 5 or when used alone. The broiler splatter guard 29 may be positioned within the food cooking enclosure 5 as shown in FIG. 1. However, in an alternate embodiment (not shown), the food cooking enclosure 5 may be placed within the broiler splatter guard 29 depending on the size of the broiler splatter guard 29. Preferred embodiment dimensions are disclosed in paragraph [0026]. The lid 40 is configured to fit upon the top of the broiler splatter guard 29 when the broiler splatter guard 29 is used without the benefit of the food cooking enclosure 5.

Figure 3:
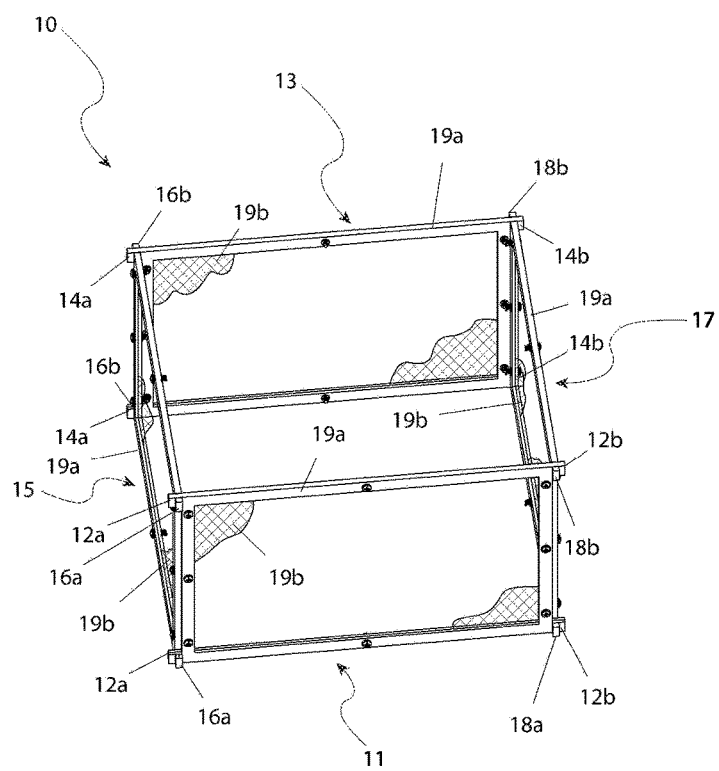
FIG. 3 is a top perspective view of a frame assembly, according to a preferred embodiment of the present invention.
Figure 4:
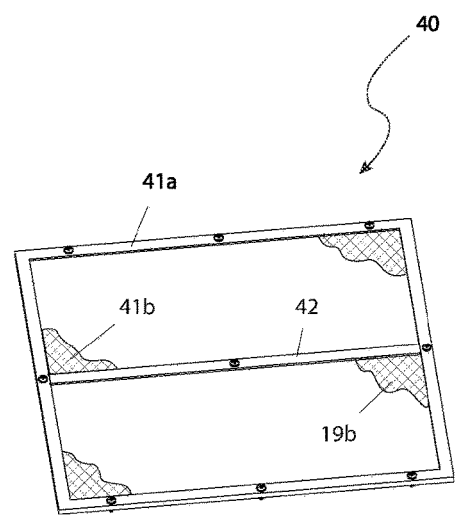
FIG. 4 is a top perspective view of a lid, according to a preferred embodiment of the present invention.

Referring now more closely to FIGS. 3 and 4, illustrations of the frame 10 and lid 40 features of the food cooking enclosure 5. The frame 10 is fashioned as a four-sided box, sized to fit on top of the base cooking surface 22 such that the broiler splatter guard 29 can be placed fully inside the frame 10. The frame 10 comprises four (4) generally identical frame components, each having a solid perimeter body 19a with a mesh screen 19b affixed thereto to cover the entire area between the perimeter body 19a. The lid 40 is shaped similar to any of the front screen 11, rear screen 13, first side screen 15, and second side screen 17, (i.e., having a lid perimeter body 41a with a lid screen 41b affixed thereto to cover the entire area between the lid perimeter body 41a), but also with a secondary central solid member 42 running through a bisecting centerline thereof. The lid 40 is sized to cover the entire open arear between the screens 11, 13, 15, 17.

The frame 10 includes a front screen 11 having a pair of front screen first side tabs 12a each extending away from an upper and lower portion of a first side of the solid perimeter body and a pair of front screen second side tabs 12b each extending away from an upper and lower portion of a second side of the solid perimeter body. The frame 10 further includes a rear screen 13 having a pair of rear screen first side tabs 14a each extending away from an upper and lower portion of a first side of the solid perimeter body and a pair of rear screen second side tabs 14b each extending away from an upper and lower portion of a second side of the solid perimeter body. The frame 10 still further includes a first side screen 15 having a pair of first side screen first side tabs 16*a* each extending away from an upper and lower portion of a first side of the solid perimeter body and a pair of first side screen second side tabs 16*b* each extending away from an upper and lower portion of a second side of the solid perimeter body. The frame 10 yet further includes a second side screen 17 having a pair of second side screen first side tabs 18*a* each extending away from an upper and lower portion of a first side of the solid perimeter body and a pair of second side screen second side tabs 18*b* each extending away from an upper and lower portion of a second side of the solid perimeter body.

To assemble the frame 10 from its components to a four-sided box, the front screen first side tabs 12*a* matingly engage with the first side screen first side tabs 16*a*, the rear screen first side tabs 14*a* matingly engage with the first side screen second side tabs 16*b*, the front screen second side tabs 12*b* matingly engage with the second side screen first side tabs 18*a*, and the rear screen second side tabs 14*b* matingly engage with the second side screen second side tabs 18*b*.

Figure 6:
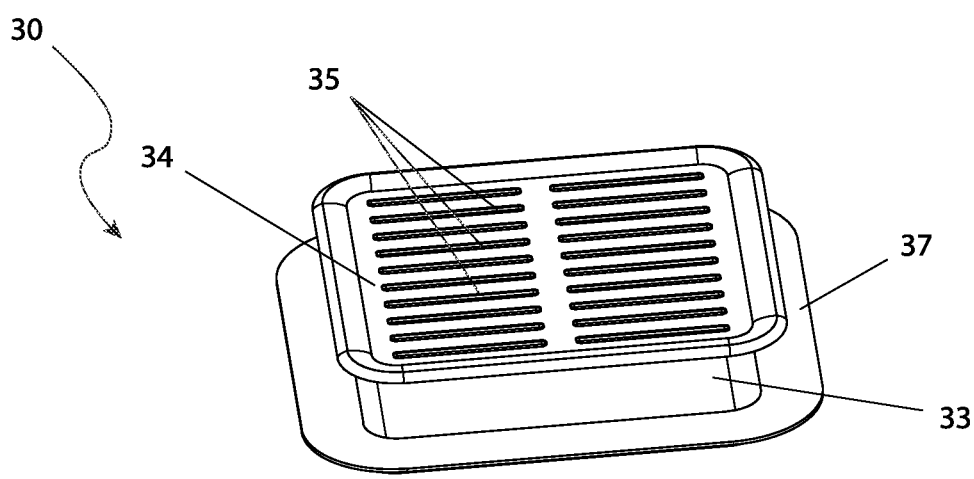
FIG. 6 is a top perspective view of a second insert, according to a preferred embodiment of the present invention.

Referring now to FIG. 6, which illustrates the second insert 30. The second insert 30 is similar in feature and construction as the base 20, albeit with a smaller footprint. The second insert 30 may include a second insert basin 33 having a top opening and a top interior with a perimeter second insert lip 37 extending outward from the sidewalls. A second insert cooking surface 34 can be placed within the second insert basin 33. The second insert cooking surface 34 in a preferred embodiment has a plurality of second insert cooking surface apertures 35 to allow drippings to pass through and collect in the second insert basin 33.

Referring now to FIG. 7, the second insert 30 is intended to be suspended from the upper perimeter portions on the solid perimeter body 19*a* of any of the screens 11, 13, 15, 17. To accomplish this, a first bracket 31*a* with a pair of distal first bracket lips 32*a* intended to engage the upper surface of the solid perimeter bodies 19*a* of any of the screens 11, 13, 15, 17. Similarly, there is a second bracket 31*b* with a pair of distal second bracket lips 32*b* intended to engage the upper surface of the solid perimeter bodies 19*a* of any of the screens 11, 13, 15, 17. The overall shape of the brackets 31*a*, 31*b* is generally shaped as a straight-sided "U". The second insert 30 (specifically the underside of the second insert basin 33) is capable of resting on both of the brackets 31*a*, 31*b*, preferably such that center of gravity of the second insert 30 (and any foodstuffs placed thereon) is shared between the center of gravity of the brackets 31*a*, 31*b*.

In a preferred embodiment, the dimensions for the base 20 is seventeen inches (17 in.) in width and fifteen and one-half inches (15½ in.) in length, the frame 10 to be fourteen and one-half inches (14½ in.) in width, thirteen and one-half inches (13½ in.) in length, and nine inches (9 in.) in height, and the broiler splatter guard 29 to be fourteen and three-eighths (14⅜ in.) inches in width, thirteen and three-eighths inches (13⅜ in.) in length, and two and one-quarter inches in height. Other embodiments may provide for removable screens 19*a* and lid screen 41*b* within the solid perimeter bodies 19*a* of any or all of the front screen 11, rear screen 13, first side screen 15, second side screen 17, and lid 40. The perimeter bodies 19*a* of the front screen 11, rear screen 13, first side screen 15, second side screen 17, and the lid perimeter body 41*a* of the lid 40 are preferably manufactured out of 304 stainless steel and the screens 19*b* and the lid screen 41*b* is preferably manufactured out of 30 mesh 304 stainless steel.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A food cooking enclosure, comprising:
    a frame having a four-sided box adapted to fit on top of a base cooking surface, the frame includes a solid perimeter body;
    a lid having a lid perimeter body with a lid screen affixed thereto to cover the lid perimeter body;
    a base having a base basin with a top opening and an interior with a perimeter lip extending outward from a first plurality of sidewalls, the base cooking surface is placed within the base basin to allow a first plurality of drippings to collect in the base basin and the frame and the lid are disposed on the base;
    a broiler splatter guard having a four-sided structure placed on the base cooking surface; and
    a second insert including a second insert basin with a top opening and a top interior with a perimeter second insert lip extending outward from a second plurality of sidewalls, the second insert is suspended from an upper perimeter portions on the solid perimeter body.

2. The food cooking enclosure, according to claim 1, wherein the solid perimeter body includes a mesh screen affixed thereto to cover the solid perimeter body.

3. The food cooking enclosure, according to claim 1, wherein the frame includes a front screen having a pair of front screen first side tabs each extending away from an upper portion and a lower portion of a first side of the solid perimeter body.

4. The food cooking enclosure, according to claim 3, wherein the frame further includes a rear screen having a pair of rear screen first side tabs each extending away from the upper portion and the lower portion of the first side of the solid perimeter body.

5. The food cooking enclosure, according to claim 3, wherein the frame includes a pair of rear screen second side tabs each extending away from an upper portion and a lower portion of a second side of the solid perimeter body.

6. The food cooking enclosure, according to claim 5, wherein the frame includes a pair of front screen second side tabs each extending away from the upper portion and the lower portion of the second side of the solid perimeter body.

7. The food cooking enclosure, according to claim 1, wherein broiler splatter guard includes a four-sided structure placed on the base cooking surface to support one or more foodstuffs placed on the base cooking surface.

8. The food cooking enclosure, according to claim 1, wherein the broiler splatter guard is contained within the basin.

9. The food cooking enclosure, according to claim 1, wherein the base, the broiler splatter guard, the second insert, and the lid are utilized interchangeably.

10. The food cooking enclosure, according to claim 1, wherein a second insert cooking surface is placed within the second insert basin.

11. The food cooking enclosure, according to claim 10, wherein the second insert cooking surface includes a plurality of second insert cooking surface apertures to allow a second plurality of drippings to pass through and collect in the second insert basin.

12. The food cooking enclosure, according to claim 1, further comprising a first bracket with a pair of distal first bracket lips intended to engage the upper surface of the solid perimeter bodies of one of the screens.

13. The food cooking enclosure, according to claim 12, further comprising a second bracket with a pair of distal second bracket lips intended to engage the upper surface of the solid perimeter bodies of one of the screens.

14. The food cooking enclosure, according to claim 13, wherein the brackets are generally shaped as a straight-sided "U".

15. The food cooking enclosure, according to claim 1, wherein the food cooking enclosure is a clean and compact cooking enclosure for a plurality of food adapted to be cooked in an oven-type enclosure.

16. The food cooking enclosure, according to claim 1, wherein the food cooking enclosure is made of an inert material.

17. The food cooking enclosure, according to claim 1, wherein the food cooking enclosure is made of a washable material.

18. The food cooking enclosure, according to claim 1, wherein the food cooking enclosure is made of a material that withstands cooking temperature.

19. The food cooking enclosure, according to claim 18, wherein the food cooking enclosure is made of stainless steel.

20. The food cooking enclosure, according to claim 1, wherein the food cooking enclosure has a conventional broiler pan dimensions.

* * * * *